Sept. 23, 1941.         J. J. MIKINA                 2,256,813
                      ARTIFICIAL MINNOW
                    Filed Feb. 28, 1940
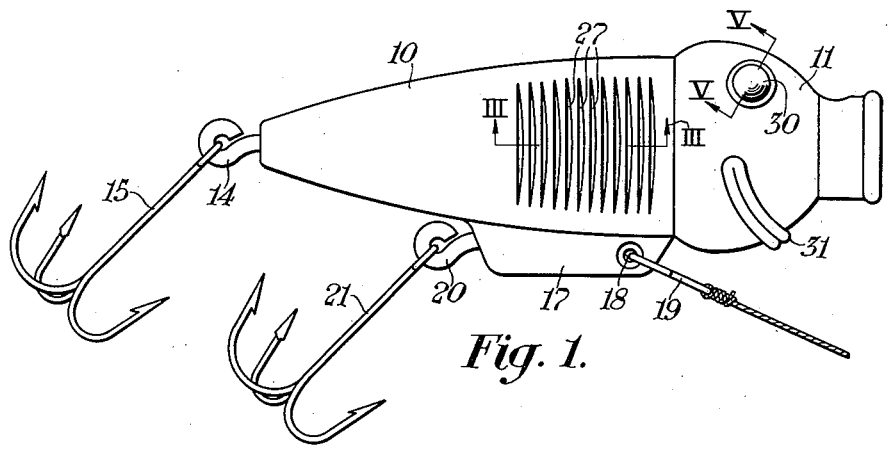
Fig. 1.
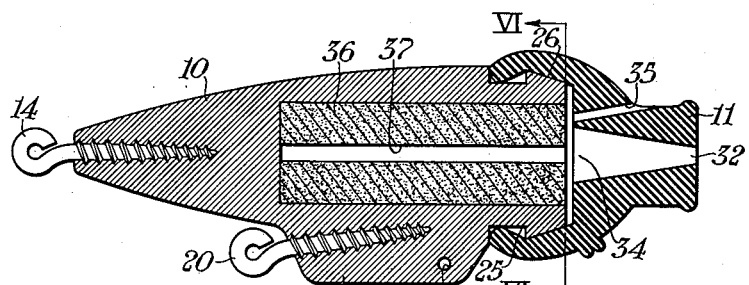
Fig. 2.
  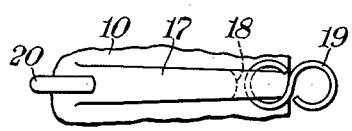  
Fig. 3.         Fig. 4.         Fig. 5.
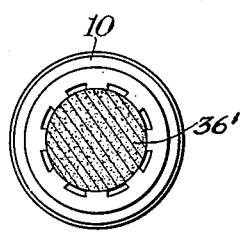
Fig. 6.
INVENTOR
Joseph J. Mikina.
BY
HIS ATTORNEY Patented Sept. 23, 1941

2,256,813

UNITED STATES PATENT OFFICE 2,256,813

ARTIFICIAL MINNOW

Joseph J. Mikina, Detroit, Mich.

Application February 28, 1940, Serial No. 321,202

10 Claims. (Cl. 43—46)

My invention relates to an improved artificial fish lure.

The success of an artificial fish lure depends on its ability to attract fish, while this property depends upon its ability to simulate a live minnow.

It is an object of my invention to provide an improved artificial fish lure which will more nearly simulate a live minnow than the lures heretofore available.

Another object of my invention is to provide an artificial fish lure which when in use will emit gas bubbles through outlets provided in the body of the lure to provide a realistic breathing appearance which will be effective in attracting fish.

A further object of the invention is to provide an improved artificial fish lure of the type described and having a body having therein a cavity in which is mounted a capsule or tablet of material which when immersed in water will generate bubbles which are discharged from the cavity through ports or passages in the body.

Another object of the invention is to provide an improved fish lure of the type described in which the capsule or tablet employed is large enough to serve for a substantial time interval, the lure being arranged so that the capsule can be replaced quickly and easily when required.

A further object of the invention is to provide an improved fish lure of the type described and arranged so that when the lure is drawn through the water there is free circulation of water over the surface of the capsule employed therein.

Another object of the invention is to provide an improved artificial fish lure having the point of attachment of the fish line thereto arranged so that when the line is reeled in the lure will rise to the surface so that by varying the rate at which the line is reeled in the lure can be made to change its direction and depth abruptly in a life-like manner.

A further object of the invention is to provide an improved artificial fish lure which can be manufactured economically and which will withstand rough usage.

Other objects of the invention and features of novelty will be apparent from the following description taken in connection with the accompanying drawing in which, Fig. 1 is a side elevational view of the preferred embodiment of my invention, Fig. 2 is a sectional view taken substantially along the vertical longitudinal plane of the lure shown in Fig. 1, Fig. 3 is a fragmentary sectional view taken substantially along the line 3—3 of Fig. 1, Fig. 4 is a fragmentary view of the bottom of the lure, Fig. 5 is a fragmentary sectional view taken substantially along the line 5—5 of Fig. 1, and Fig. 6 is a fragmentary sectional view of a modification which I may employ.

Referring to the drawing the lure provided by this invention has a body having a principal portion 10 and a nose portion 11. The principal portion 10 is substantially circular in cross-section transversely and tapering in cross-section longitudinally so that the body simulates that of a small fish or minnow in size, shape and appearance.

The body portion 10 may be formed of any suitable material, but I prefer to mold it from a plastic composition which is impervious to water. This material is preferably of a composition such that its color is similar to that of a live fish.

The rear of the body portion 10 terminates in a tail portion in which is secured a screw eye 14 which is adapted to have attached thereto a gang hook 15.

A downwardly extending fin 17 is formed on the bottom of the body portion 10, while the forward end of the fin has an eye 18 in which is secured an S-shaped link 19 to which the fish line is connected.

A screw eye 20 projects from the rear of the fin 17 and is adapted to have a gang hook 21 attached thereto.

The screw eyes 14 and 20 may be secured in position in any desired manner, but in the preferred embodiment these screw eyes have self-tapping threads and are screwed into holes provided in the body portion 10.

The forward end of the body portion is surrounded by an annular groove 25 while a flange 26 is located between the groove 25 and the end of the body. The flange 26 has a conical surface to aid in attaching the head portion 11.

In addition, the sides of the body each have a series of serrations or parallel ribs 27 which are adapted to be engaged by an angler's thumb and fingers so that the lure can be held securely when the head portion is being removed or replaced. These serrations or ribs are formed by spaced grooves in the face of the body so that the tops of the serrations or ribs are approximately in the same plane as the face of the body would occupy, if the serrations were not present, as is clearly shown in Fig. 3. This design insures that the serrations will create only a minimum of disturbance when the lure is drawn through the water.

The head portion of the lure is formed of a suitable resilient material, such as rubber, and is of such configuration that it simulates the head of a small fish. The rear end of the head portion 11 has a cylindrical wall which surrounds the end of the body portion 10. This circular wall extends over the flange 26 and into the groove 25, while the wall is molded slightly smaller than the body 10 so that the material of the wall is under tension when in position. The construction of the head portion 11 is such that the marginal portion of the wall contracts into the groove 25 to hold the head portion securely in position and to draw the inner face of the wall firmly against the conical surface of the flange 26 and thus prevent the escape of gas bubbles through the joint between the head and body portions.

If desired the head portion may have sockets formed therein in which are mounted eyes 30, as shown in Fig. 5, while ribs may project from the surface as indicated at 31 to simulate a mouth.

The head portion 11 has a central passage 32 which opens on the front face of this portion. The open end of this passage is of relatively small diameter, while the passage increases in diameter away from the face of the member so that a chamber 34 of substantial volume is formed between the inner face of the head portion 11 and the end of the body portion 10. The head portion 11 has another passage 35 formed therein and leading from the chamber 34 to the face of the member 11 at a point somewhat rearwardly of the point on the face at which the passage 32 opens on the face of the member.

The body portion 10 has a substantially cylindrical cavity therein which is open at one end to the reaction chamber 34 while a capsule 36 is mounted in this cavity.

The capsule 36 is formed of chemicals such that when water comes in contact with the capsule gas is generated. The rate of generation of gas is affected by the surface area of the capsule which comes in contact with the water, and to insure that there is ample exposed surface the capsule is preferably provided with a central opening or passage as indicated at 37. This passage also permits gas which forms at the closed end of the bore in the body 10 to flow to the reaction chamber 34 to thereby equalize the pressures at opposite ends of the capsule and thus prevent displacement of the capsule by gas pressure.

A modification which I may employ is shown in Fig. 6. This employs a solid capsule 36', while grooves are formed in the surface of the bore in the body 10 to increase the surface area of the capsule exposed to water and to permit flow of gas from the base of the bore in the body to the reaction chamber 34.

The capsule 36 may be of any suitable chemical composition, but I prefer to employ a mixture of sodium bicarbonate and tartaric acid, while the material of the capsule is compressed into a rigid tablet which will hold its shape and will dissolve in water at the proper rate.

In use the lure is cast into the water and is then reeled in in the customary manner. When the lure is immersed water flows through the passage 32 to the reaction chamber 34, where it comes into contact with the capsule 36 with the result that gas is generated and escapes through the discharge opening 35. The gas escapes as bubbles, and the rate of formation of the gas is such that the bubbles are released at a rate which provides a realistic breathing effect which has been found to be effective in attracting fish.

As the plug is reeled in the water exerts pressure on the front surface of the head portion due to movement of the plug through the water. The region of maximum pressure is at the front face of the head portion, that is, at the point at which the passage 32 ends, while somewhat lower pressure is exerted on the area at which the passage 35 opens. Accordingly water flows through the passage 32 to the reaction chamber 34, while water and gas escape from the reaction chamber 34 through the discharge passage 35. This arrangement insures that there will be ample circulation of water through the reaction chamber 34 and across the surface of the capsule 36 to generate an adequate supply of gas.

It has been found that a capsule will last a substantial time interval, while new capsules can be readily installed when necessary. In order to install a capsule, the head portion is removed. This can be done easily by holding the body portion 10 by the serrations 27, while the head portion, being formed of rubber, is easily drawn from the end of the body portion. The new capsule is then inserted in the chamber in the body, and the head portion is replaced. The conical surface on the flange 26 facilitates insertion of the end of the body portion 10 into the recess in the head portion, while the head and body portions are then pressed together.

It will be seen that installation of a new capsule can be made quickly and easily without disturbing the connection of the line with the lure. In addition it will be seen that the line is connected directly to the body portion 10 to which the hooks are attached so that there is no danger that the head and body portions will separate when a fish is caught.

It will be seen also that the line is connected with the lure at a point below the longitudinal axis of symmetry, and somewhat nearer the front end than the rear end of the lure. As a result when the lure is drawn through the water the pressure of the water on the lure lifts the front of the lure so that the lure rises in the water as a kite rises in the air. The specific gravity of the lure is somewhat greater than that of water so that the lure normally tends to sink in the water. However, because of the lifting action of the lure as it is drawn through the water, the angler can regulate the depth at which the lure travels. Thus, if the lure is reeled in rapidly it will remain close to that surface, while if the lure is reeled in slowly so that the lifting action is insufficient to overcome the force of gravity the lure will travel at a deeper level. If the rate at which the lure is reeled in is varied the lure can be made to alternately rise to the surface and then dive to a deeper level.

Although I have herein illustrated and described in detail one form of improved artificial fish lure embodying my invention, it should be understood that the invention is not limited to these details and that numerous changes and modifications may be made without departing from the following claims.

Having thus described my invention, what I claim is:

1. In an artificial fish lure, in combination, a body having a chamber therein and having in said chamber a quantity of material which when moistened with water generates a gas, the body having a passage therein through which water may flow to said chamber and also having a passage through which gas formed in said chamber may escape and be released from the body as bubbles to provide a breathing appearance.

2. In an artificial fish lure, in combination, a body having a chamber therein, a capsule in said chamber comprising a mixture of sodium bicarbonate and tartaric acid, the body having a passage therein through which water may flow to said chamber when the lure is in use, and having a discharge passage through which gas formed in said chamber on contact of water with the capsule may escape from the chamber and be released from the body as bubbles to simulate the breathing action of a fish.

3. In an artificial fish lure, in combination, a body having a bore therein opening at the forward end of the body, a head portion detachably secured to the body and cooperating with said bore to form a chamber, a capsule of material in said chamber adapted when moistened with water to generate gas, the head portion having a passage therein through which water may flow to said chamber when the lure is in use and also having a passage therein through which gas formed in said chamber may escape and form bubbles to provide a breathing appearance.

4. In an artificial fish lure, in combination, a body having a bore therein opening at the forward end of the body, a head portion detachably secured to the body and cooperating with said bore to form a chamber, a capsule of material in said chamber adapted when moistened with water to generate gas, the head portion having a passage therein through which water may flow to said chamber when the lure is in use and also having a passage therein through which gas formed in said chamber may escape and form bubbles to provide a breathing appearance, the capsule having a passage extending therethrough to provide increased surface area exposed to water in said chamber and to permit the pressures of the gas at opposite sides of the capsule to equalize.

5. In an artificial fish lure, in combination, a body comprising a principal and a head portion detachably secured together, the principal portion having a fish hook secured thereto and having means by which the line may be connected thereto independently of the head portion, whereby when a fish is caught on the hook force is not exerted tending to separate the head and principal portions, the body portions cooperating to form a chamber, and a quantity of material in said chamber adapted when moistened to generate a gas, one of the body portions having a passage therein through which water may flow to said chamber, one of the body portions having a passage therein through which gas may flow from said chamber and escape as bubbles to create a breathing appearance.

6. In an artificial fish lure, in combination, a body having a principal portion formed of substantially rigid material and a head portion formed of resiliently elastic material such as rubber, the head portion having a cylindrical wall surrounding an end of the principal portion, the end of the principal portion and the wall being proportioned so that the wall is under tension when in position and is drawn firmly against the surface of the body principal portion by the inherent resiliency of the material of which the head portion is constructed, whereby the head and body portions are detachably secured together, the body principal and head portions cooperating to form a chamber, a quantity of material in said chamber adapted when moistened to generate gas, one of the body portions having a passage therein through which water may flow to said chamber when the lure is in use, one of the body portions having a passage therein through which gas may flow from said chamber and escape as bubbles to provide a breathing appearance.

7. In an artificial fish lure, in combination, a body having a principal portion formed of substantially rigid material and a head portion formed of resiliently elastic material such as rubber, the body portions cooperating to form a chamber, the forward end of said principal portion being substantially circular in cross-section, the outer surface of said principal portion having a groove therein which is separated from the end of said principal portion by a flange, the head portion having a cylindrical wall adapted to receive the forward end of the principal portion, the end of the principal portion and said wall being proportioned so that the wall is under tension when in position and the marginal portion of the wall is drawn into the groove to maintain the head and principal portions together and so that the inner surface of the wall is drawn firmly against the face of the flange to form a tight seal to prevent undesired escape of gas from said chamber, and a capsule of material in said chamber adapted when moistened to generate gas, one of said body portions having a passage therein through which water may flow to said chamber when the lure is in use, one of the body portions having a passage therein through which gas may escape from said chamber and be released as bubbles to create a breathing appearance.

8. In an artificial fish lure, in combination, a fish-shaped body comprising a plurality of portions detachably secured together and cooperating to form a chamber, and a capsule of material in said chamber adapted when moistened to generate gas, the body having an inlet passage formed therein and through which water may flow to said chamber, the body also having a discharge passage therein and through which gas may escape from said chamber, the inlet passage opening on the surface of the body at a point nearer the front end of the body than the point at which the discharge passage opens on the surface of the body, whereby when the lure is drawn through the water the pressure of the water on the surface of the lure is greater in the vicinity of the end of the inlet passage than in the vicinity of the end of the discharge passage so that when the lure is drawn through the water there is a constant circulation of water through said chamber.

9. In an artificial fish lure, in combination, a body comprising a pair of members detachably secured together and cooperating to form a chamber, a capsule of material mounted in said chamber and adapted when moistened to generate gas, the body having an inlet passage and an outlet passage communicating with the region at one face of said capsule, the inlet passage providing means for water to flow to said chamber when the lure is in use, the outlet passage providing means for gas to escape from said chamber and form bubbles to create a breathing appearance, and means for permitting gas formed at the face of said capsule opposite said one face to flow to the region at said one face to thereby equalize the pressure on opposite faces of the said capsule.

10. In an artificial fish lure, in combination, a body comprising primary and secondary portions detachably secured together, the primary portion having a fish hook secured thereto and having means by which the line may be secured thereto independently of the secondary portion, whereby said primary and secondary portions may be separated without disturbing connection of the line with the lure and whereby when a fish is caught on the hook force is not exerted tending to separate said primary and secondary portions, said primary and secondary portions cooperating to form a chamber, and a capsule of material in said chamber adapted when moistened to generate a gas, one of said body portions having an inlet passage formed therein through which water may flow to said chamber when the lure is in use, one of said body portions having a discharge passage formed therein through which gas may escape from said chamber and be released as bubbles to create a breathing appearance.

JOSEPH J. MIKINA.